(12) United States Patent
Hersent

(10) Patent No.: US 10,129,789 B2
(45) Date of Patent: Nov. 13, 2018

(54) METHODS FOR ENCODING AND DECODING FRAMES IN A TELECOMMUNICATION NETWORK

(71) Applicant: ACTILITY, Lannion (FR)

(72) Inventor: Olivier Hersent, Louveciennes (FR)

(73) Assignee: ACTILITY, Paris (FR)

( * ) Notice: Subject to any disclaimer, the term of this patent is extended or adjusted under 35 U.S.C. 154(b) by 71 days.

(21) Appl. No.: 15/302,831

(22) PCT Filed: Mar. 31, 2015

(86) PCT No.: PCT/FR2015/050826
§ 371 (c)(1),
(2) Date: Oct. 7, 2016

(87) PCT Pub. No.: WO2015/155440
PCT Pub. Date: Oct. 15, 2015

(65) Prior Publication Data
US 2017/0041826 A1    Feb. 9, 2017

(30) Foreign Application Priority Data

Apr. 9, 2014 (FR) .................................... 14 53141

(51) Int. Cl.
| | | |
|---|---|---|
| H04W 84/12 | (2009.01) | |
| H04W 28/06 | (2009.01) | |
| H04W 12/02 | (2009.01) | |
| H04W 12/10 | (2009.01) | |
| H04W 4/70 | (2018.01) | |
| H04W 84/18 | (2009.01) | |

(52) U.S. Cl.
CPC .......... *H04W 28/065* (2013.01); *H04W 4/70* (2018.02); *H04W 12/02* (2013.01); *H04W 12/10* (2013.01); *H04W 84/18* (2013.01)

(58) Field of Classification Search
CPC .... H04W 28/065; H04W 4/005; H04W 84/18
See application file for complete search history.

(56) References Cited

U.S. PATENT DOCUMENTS

| | | | |
|---|---|---|---|
| 8,984,635 B1* | 3/2015 | Graham-Cumming | ...................... H04L 9/3239 726/23 |
| 2003/0210787 A1* | 11/2003 | Billhartz | ............. H04L 63/0435 380/270 |
| 2004/0019764 A1* | 1/2004 | Steiss | ...................... G06F 9/345 711/216 |
| 2005/0240989 A1* | 10/2005 | Kim | ..................... H04L 63/0254 726/11 |
| 2009/0111491 A1* | 4/2009 | Lemberg | ........... H04M 1/72533 455/466 |
| 2009/0249466 A1* | 10/2009 | Motil | .................. H04L 63/0245 726/12 |
| 2010/0046443 A1 | 2/2010 | Jia et al. | |

(Continued)

FOREIGN PATENT DOCUMENTS

| | | |
|---|---|---|
| EP | 2 571 306 A1 | 3/2013 |
| WO | 2008/059475 A1 | 5/2008 |

*Primary Examiner* — Andrew Lee
(74) *Attorney, Agent, or Firm* — Dentons US LLP

(57) ABSTRACT

The invention relates to a method of receiving a data frame emitted by a node, wherein a database containing entries on said nodes and at least one hash code included in said frame are used to decode this frame.

18 Claims, 7 Drawing Sheets

(56) References Cited

U.S. PATENT DOCUMENTS

| | | | |
|---|---|---|---|
| 2010/0199095 A1* | 8/2010 | Ho | H04L 9/0844 713/171 |
| 2010/0281257 A1* | 11/2010 | Yamazaki | H04L 63/0209 713/168 |
| 2011/0093593 A1* | 4/2011 | Shirakata | H04L 63/08 709/225 |
| 2013/0151849 A1* | 6/2013 | Graham | H04L 9/32 713/164 |
| 2014/0325221 A1* | 10/2014 | Rothschild | H04L 63/0815 713/168 |
| 2014/0331310 A1* | 11/2014 | Salada | G06Q 10/107 726/12 |
| 2015/0189239 A1* | 7/2015 | Zhao | H04N 7/18 348/143 |

* cited by examiner

METHODS FOR ENCODING AND
DECODING FRAMES IN A
TELECOMMUNICATION NETWORK

This application is a National Stage Application of International Application No. PCT/FR2015/050826, filed on Mar. 31, 2015, which claims the benefit of French Patent Application No. 14 53141, filed on Apr. 9, 2014, all of which are hereby incorporated by reference in their entirety for all purposes as if fully set forth herein.

TECHNICAL FIELD OF THE INVENTION

The present invention belongs to the domain of encoding/decoding data transmitted in a telecommunication network, particularly in a low data rate network. The invention relates to a method exploiting encoding and decoding techniques for reducing the size of the frames transmitted.

This method is particularly advantageous in the case of sensors performing measurements to be transmitted to remote equipment.

PRIOR ART

In the development of the Internet of things, more and more devices need to be connected, continuously or periodically, to a communication network. These devices often need to send or receive a very small amount of data, typically a few bytes sent once per hour.

Until recently, these devices did not need to be correctly taken into consideration by existing M2M (Machine to Machine) communication networks when they extend into:
  cellular data networks, for example GPRS (General Packet Radio Service) or 3G (3rd generation), generally intended for high data rate use. The energy consumption for wireless devices connected to such networks generally makes them unsuitable for market segments in which battery-powered sensors (for example gas or water sensors) have to operate for several years;
  wMBUS (wireless M-BUS) and similar technologies have a limited range, requiring large and expensive batteries for the sensors.

New radio technologies, using ultra-narrow frequency bands or spread spectrum techniques, have recently been able to supply extensive connectivity (typically 1 to 2 km in urban areas) for a very low data rate (typically 100 to 1000 bits per second) over ISM (Industrial, Scientific and Medical) frequency bands.

However, the low rate involves relatively long over-the-air transmission times while mobilizing rare spectrum resources. Therefore, for these low rate M2M networks to be successful, reducing the size of the transmitted data frames as much as possible is essential. Frame size strongly depends on the headers relative to the link and network layers, especially when the device only has to transmit a small amount of data when it sends a frame. The maximum number of sensors per cell directly depends on the size of the frames transmitted:
  low data rate networks are often non-synchronized and require a low occupation rate of the channel to maintain low collision rates and to operate correctly (typically channel occupation below 5%). The channel occupation rate is proportional to the number of messages sent per unit of time, and to the size of the frame transmitted;
  in many countries, ISM spectrum regulation requires that every antenna transmits less than a given percentage of time (typically approximately 1%). This generally is the limiting factor dominating bidirectional networks. Here again, the base station antenna occupation time rate is proportional to the number of messages sent by the antenna per unit of time, and to the size of the frame transmitted.

One example of a current optimization system for effective low data rate use is the 6LoWPAN (IPv6 Low power Wireless Personal Area Networks). Such a network is based on the shared state between network ends and the coordinator, and also exploits redundancies between the MAC (Medium Access Control) layer and the IP (Internet Protocol) layer.

In the MAC layer, optimization mechanisms comprise smaller spaces for addressing sensors (for example 16 bits instead of 64 bits), but this has the consequence of reducing the number of possible sensors in the network.

However, such systems do not exploit redundancies between different PDU (protocol data unit) fields, within a given OSI (open system interconnection) layer.

Redundancy of information existing between two successively decoded data frames is also not exploited.

In addition, these systems are designed to supply unambiguous decompression of each element of a data frame. In fact, all information necessary for decoding all of the data is directly included in a frame. A particular decompression method is usually provided for each frame element.

Lastly, in existing techniques, the transmitting/receiving methods employed utilize the diversity of information issued from received signals in a limited manner. This information is typically only used to organize migration from one receiver to another (a procedure known as a "handover").

SUMMARY OF THE INVENTION

The system aims to reduce the global size of frames for M2M low data rate wireless communications and to optimize operation within a context of strong constraints on rates, transmission channel occupation times and the volume of information exchanged.

The invention proposes a method of receiving a data frame emitted in a network connected to several nodes, wherein an address and a secret are respectively assigned to each node, the method comprising:
  extracting encoded data and a frame hash code from the frame;
  consulting a database with respective entries relating to nodes, the entry relating to a node containing information including the address and the secret assigned to this node;
  for at least one database entry:
    calculating at least one hash code from elements comprising encoded data extracted from the frame and the secret contained in the entry;
    comparing the calculated hash code with the frame hash code extracted from the frame; and
    selecting the entry if the compared hash codes coincide;
  and processing the frame.

Processing comprises identifying the address contained in the selected entry as being the address assigned to the node where the frame comes from, and decoding the encoded data extracted from the frame by using the secret contained in the selected entry.

"Node" is understood to refer to a data acquisition device, associated with at least one radio station.

Here the hash code, conventionally used to verify the integrity of the frame, is also exploited to contribute to identifying the address of the device having emitted the frame. Therefore, reducing header size is made possible because the address no longer needs to be entirely transmitted in the header.

The most drastic is to no longer include the entire address in the header, but this may require the telecommunication system in charge of receiving the frame to explore a too-big database.

A reasonable compromise between minimizing the frame size and the load on the system in charge of receiving the frame is to truncate the address included in the header. For example, it is possible to reduce the size of the address field in the header to 16 bits instead of 32.

Therefore, in an embodiment, incomplete address data is also extracted from the frame, and hash code calculating and comparing steps are executed for entries from the database containing an address corresponding to the incomplete address data extracted.

Elements for calculating the hash code for a database entry may include at least one part of the address contained in said entry.

In an embodiment, information contained in the database entry relating to a node also includes pointer information from at least one sequence number from a frame that was received and processed by identifying the address contained in the entry. In this embodiment, elements from which at least one hash code is calculated also comprise an integer determined according to pointer information contained in the entry.

Therefore, information deduced from decoding previous frames can be reused for the current frame. The sequence number from a last frame was previously stored when it was decoded, and can be read when a new frame is decoded in order to identify a sequence number, or a range of sequence numbers if frame losses are possible, to be tested in the hash code calculating and comparing steps. This will inform the system in charge of receiving the frame of the sequence number of the current frame without needing to include it in information explicitly provided in the frame.

Frame processing may therefore comprise a determination of a frame sequence number from among a sequence of frames emitted from the identified address, and an update of pointer information contained in the selected entry according to the determined sequence number of the frame.

In a particular embodiment, the hash code calculation and comparison steps are executed several times for at least one database entry. These steps are executed with respective integers chosen from an interval identified by the pointer information contained in the entry. In this embodiment, after selecting a database entry, determination of the frame sequence number comprises identification of the integer with which the compared hash codes coincide.

The size of the interval identified by pointer information contained in the entry may vary according to the calculation capacities used for implementing the method according to the invention.

In another embodiment, the power level and/or timestamp information of the frame is evaluated. Frame processing then comprises an update, in the entry relating to the node whose address was identified, of power information according to the power level evaluated and/or the timestamp information.

Timestamp information refers to any information relative to temporal aspects of frame transmission. Such information may include frame transmission times, reception times, etc.

Typically, such a power level may be a signal-to-noise ratio of the signal received, a mean energy or power calculated over a time interval corresponding to the receipt of the frame. This information is associated with the antenna which received the signal. The system in charge of receiving the frame may comprise several antennas and several antennas may receive the same frame. Therefore, in an embodiment, the entry relating to the node whose address was identified comprises power information according to the power level evaluated and/or the timestamp information for each of the antennas which received the frame.

In another embodiment, an adaptation message of at least one node transmission parameter whose address was identified is transmitted by the system in charge of receiving the frame to this node. This adaptation message is generated according to the information included in the entry relating to this node whose address was identified.

Transmission parameter refers to any variable characteristic influencing the transmission conditions of the signal emitted by the node. Therefore, the adaptation message may contain an instruction to modify at least one element from among transmission channel, transmitted power, spread spectrum factor and coding redundancy.

The node activity managed is thus rationalized. In fact, as the adaptation message is generated according to specific information on frame transmission conditions between nodes and all systems, it is possible to generate very relevant adaptation messages. Managed globally, these adaptation messages enable, for example, the network capacity to be maximized or else the global energy consumption of the system to be reduced. For example, a node for which the evaluated power is high may receive an adaptation message to reduce its emitted power in order to not consume too much energy and to not overload the network unnecessarily.

The entry relating to the node whose address was identified may also advantageously comprise at least one of the following elements:

an indication of the geographic location of nodes, such an indication may advantageously be deduced or estimated from data relative to the power and/or timestamp information;

an acknowledgment receipt waiting and periodicity time specific to a node. The node may go into standby for the receipt of an acknowledgment message for a predetermined duration following the transmission of the frame. The waiting time, possibly specific to a node, may therefore correspond to this predetermined standby duration. The system in charge of receiving the frame responsible for transmitting acknowledgements may therefore transmit acknowledgments at the exact times when nodes affected by the acknowledgment are likely to be listening. This makes possible a specific allocation of the expected channel transmission occupation time for the acknowledgments. For frequencies that are very constricted in terms of occupation time, such as the ISM spectrum, this occupation time optimization is particularly advantageous.

Another object of the invention is a method of transmitting a data frame by a node, an address and a secret being assigned to the node, the method comprising:

encoding data by means of the secret assigned to the node;
generating a hash code from elements comprising the encoded data and the secret assigned to the node; and
including the encoded data and the generated hash code in the transmitted frame In an embodiment, the method also comprises:

truncating the address assigned to the node to form incomplete address data; and including the incomplete address data in the transmitted frame.

In a particular embodiment, the address assigned to the node to form incomplete address data is over 32 bits and is truncated to form incomplete address data with a size of 16 bits.

In an embodiment, the elements from which the hash code is calculated also comprise a sequence number of the transmitted frame, this sequence number of the transmitted frame being excluded from the transmitted frame.

In an embodiment, the node may go into standby for the receipt of an acknowledgment message for a predetermined duration following transmission of the frame. This predetermined duration advantageously corresponds to the processing time (typically on the order of a second) required by the system in charge of receiving the frame to process the frame transmitted by the node and to send an acknowledgement relative to this frame. This duration is typically one second.

The node may go into this standby mode periodically. For example, the node may go into standby every two seconds for one second. Therefore, constraints imposed by ISM spectrum regulation are advantageously respected without additional management effort. In fact, in this situation, antennas of the system in charge of receiving the frame only transmit when the listening window of a node is open (when this node is not in standby). This has the effect of substantially reducing the percentage of time occupied for transmissions. Here it is noted that this percentage of time authorized for transmissions is typically approximately 1% for the ISM spectrum.

The invention also relates to a computer program comprising instructions for implementing the method described above.

The invention may be implemented by a processing and optimizing unit to communicate with several nodes, the processing and optimizing unit comprising:
  an interface with a database with respective entries relating to nodes, the entry relating to a node containing information including the address and the secret assigned to said node;
  an extraction unit for receiving a data frame and extracting encoded data and a frame hash code;
  a code verifier arranged to carry out the following operations for at least one entry from the database:
    calculating at least one hash code from elements comprising encoded data extracted from the frame received and the secret included in the information from said entry;
    comparing the calculated hash code with the frame hash code extracted from the frame received; and
    selecting said entry if the compared hash codes coincide;
  and a unit for decoding the frame received to execute processing comprising identifying the address contained in the selected entry as being the address assigned to the node where the frame received comes from, and decoding the encoded data extracted from the frame received by using the secret contained in the selected entry.

The invention may also be implemented by a system to communicate with several nodes, the system comprising:
  a plurality of antennas for receiving signals from said nodes, said signals comprising data frames; and
  the processing and optimizing unit described above for processing data frames.

Therefore, the data frame processing steps, which are expensive in terms of calculation resources, are advantageously centralized. In addition, the discriminating factor in terms of processing speed is the connection between the database and the unit in charge of decoding frames. In fact, the processing unit must scan all of the entries in the database in order to identify the address of the node which had emitted the frame. Direct and rapid access between a processing and optimizing unit, which is central, and the database is easier to implement, which substantially reduces the frame processing time.

The invention may also be implemented by a node to communicate over a network having at least one system, an address being assigned to the node and a secret also being assigned to the node, the node comprising:
  a unit for encoding data by means of the secret assigned to the node;
  a hash code generator, the hash code being generated from elements comprising the encoded data and the secret assigned to the node; and
  a generator of the frame to be emitted, the frame including encoded data and the generated hash code.

In an embodiment, the frame also comprises incomplete address data obtained by truncating the address assigned to the node.

BRIEF DESCRIPTION OF THE DRAWINGS

Other characteristics and advantages of the invention will appear upon reading the following detailed description and examples of embodiment of the invention and examining the drawings in which.

DETAILED DESCRIPTION

The invention is described below in its non-limiting application in sensor and actuator networks. Sensors are, for example, devices for geolocating objects or persons, measuring instruments for a water or gas distribution network, devices for measuring air or noise quality, electronic parking tickets, etc. These sensors or actuators are integrated or connected to radio stations. Here a sensor or actuator associated with a radio station is called a "node."

The method described here relates to the communication of digital signal frames from nodes to application servers, and from application servers to nodes. "System" refers to all of the devices between the application servers and the nodes, the application servers and the nodes being excluded from said system.

It will be noted that communications can take place in both directions between the nodes and the application servers. Uplink communication is a communication transmitted by a node to a system serving as a network transmitter for application servers. Downlink communication is a communication transmitted by a system serving as a network transmitter for application servers, to a node.

In an embodiment, the system only comprises a set of antennas and network interfaces with application servers. Each antenna is connected to a network interface which carries out the steps of decoding the frames described below with reference to FIGS. 3 and 4.

In another embodiment, the system comprises a set of antennas and network interfaces that are managed by one or more processing and optimizing units. In particular, these processing and optimizing units carry out the steps of decoding the frames described below with reference to FIGS. 3 and 4. The processing and optimizing unit is distinct from the antennas and network interfaces. This processing and optimizing unit is connected to the network interfaces via a communication channel. Here the network interfaces are responsible for the conventional radio signal shaping steps. The invention is described below with reference to this embodiment.

Figure 1A:
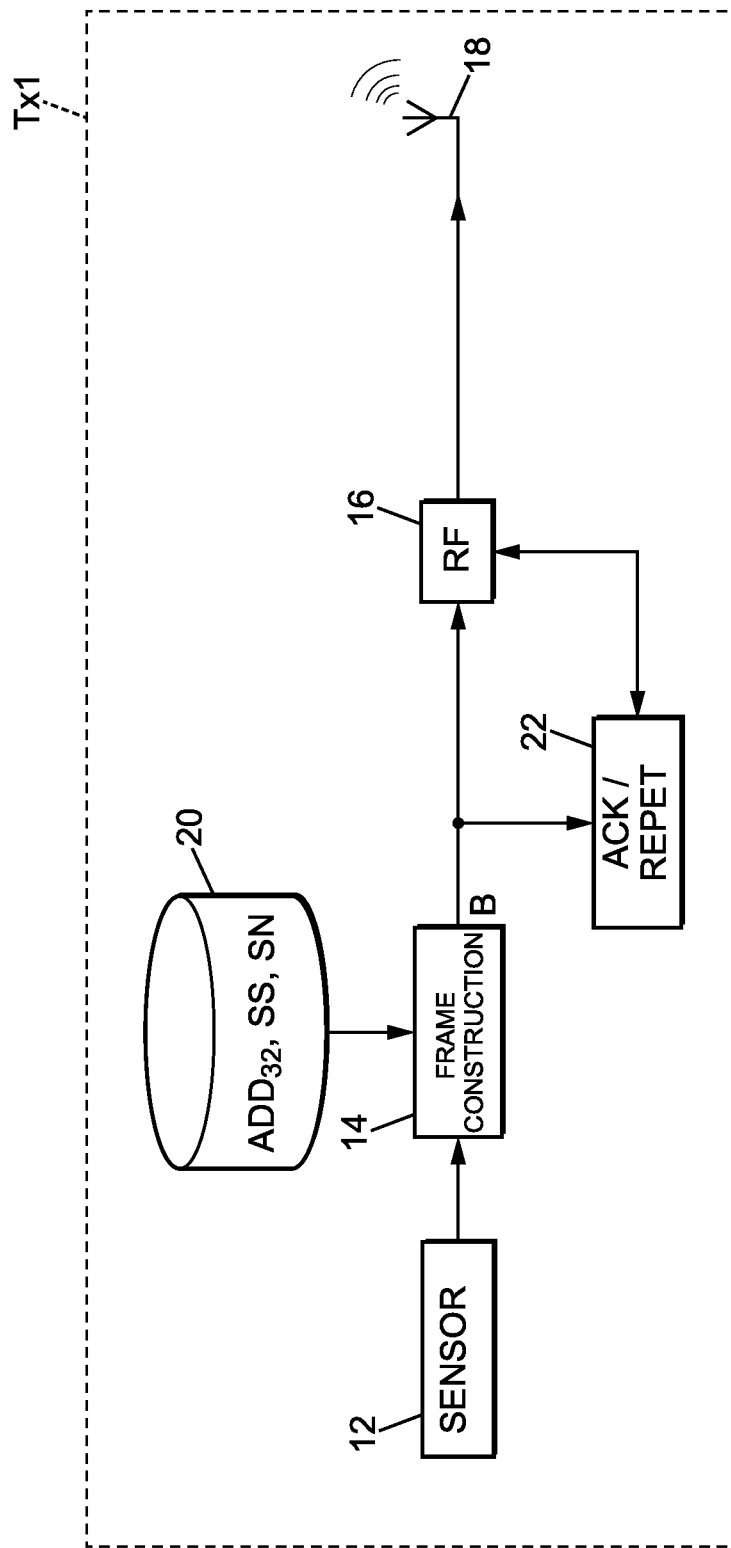
FIG. 1A is an overview of an example of a node capable of implementing the invention.

With reference to FIG. 1A, a sensor 12 supplies data of interest within a node Tx1. An address $ADD_{32}$, for example of 32 bits, and a secret SS are assigned to node Tx1. Other secrets, only known to the node, can be used by this node for encoding application data. After outputting from sensor 12, data of interest are supplied to processor 14, which ensures the construction of frames to be transmitted.

Addresses $ADD_{32}$ identify nodes within the network. Secret SS is only known to the node to which it is assigned, and it is also recorded in relation to the corresponding address, in a database DB3 only accessible to authorized processing and optimizing units in the network. Application secrets, if present, are only known to application servers.

Processor 14 of node Tx1 processes data of interest to produce a digital signal B composed of frames. A radio frequency (RF) transmit-receive stage 16 of node Tx1 receives each frame from processor 14 to shape, modulate and amplify, in a manner known in itself, a radio signal adapted to low data rate wireless M2M communication. This radio signal is transmitted via an antenna 18 of node Tx1.

Processor 14 of network node Tx1 accesses a local memory 20 where the address $ADD_{32}$ of the sensor in the network and its associated secret SS are recorded. This memory 20 also contains a sequence number SN of the last frame that processor 14 generated. The frames that a node produces are numbered consecutively, which enables the processing and optimizing units to replace each frame received in the sequence.

Figure 1B:
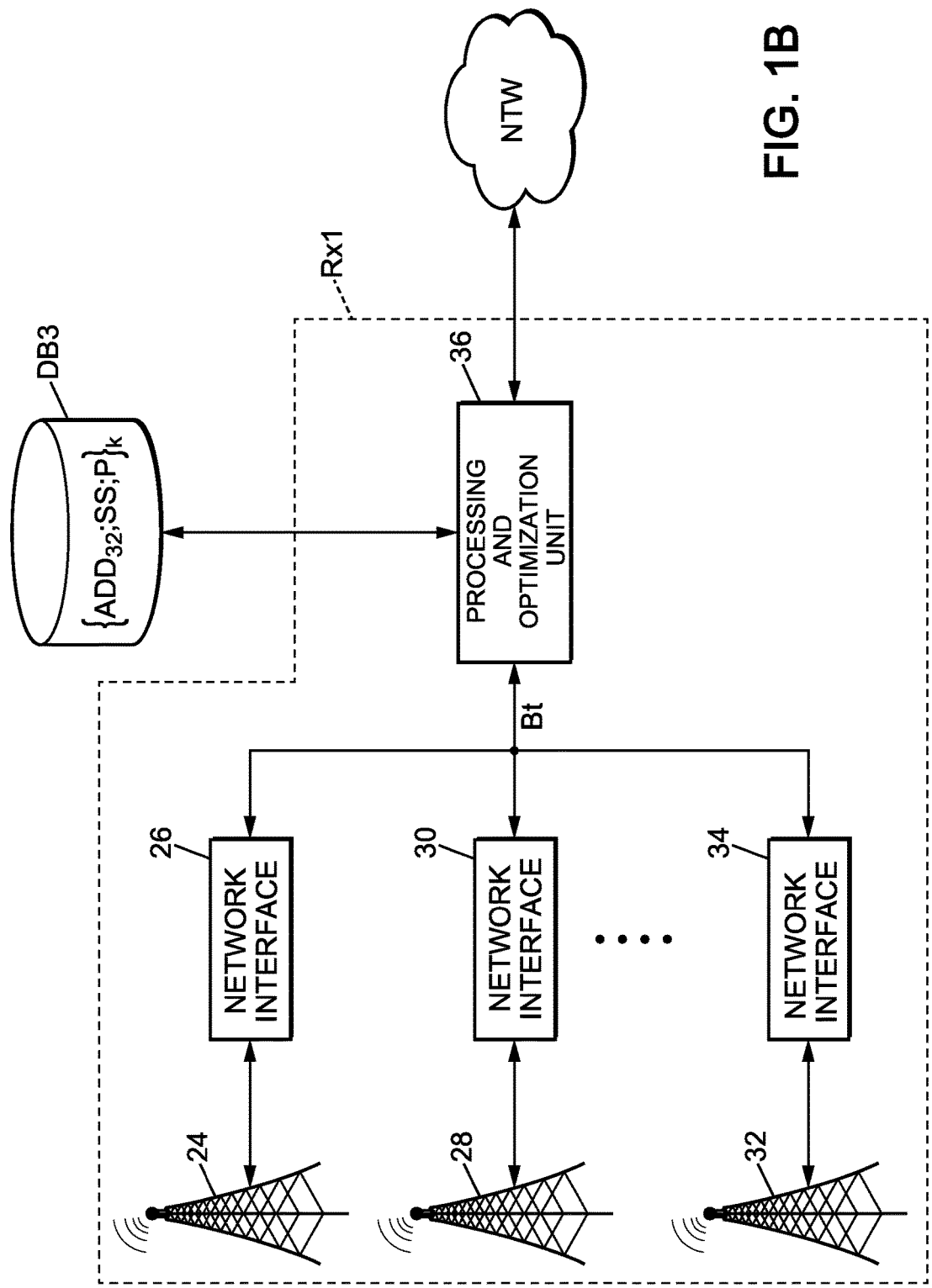
FIG. 1B is an overview of an example of a system capable of implementing the invention.

The example of system Rx1 shown in FIG. 1B comprises several network antennas 24, 28, 32 that receive radio signals and which are respectively connected to network interfaces 26, 30, 34. These network interfaces process the radio signals to produce digital frames included in a signal Bt. The Bt signal frames are similar, except for transmission errors, to the digital frames included in signals B from remote nodes. These frames are then applied to a processing and optimizing unit 36 that issues decoded data. These data can then be sent to one or more application servers via another network NTW that will generally be a fixed network.

Several system architectures are possible. Therefore, several systems such as described above in FIG. 1B can be present. It is also possible that several processing and optimizing units are present in a system. Alternatively, a single system comprising at least one processing and optimizing unit can manage all nodes.

The processing and optimizing unit 36 comprises an interface 37 for accessing database DB3 in which entries relating to the nodes taken into consideration are stored. An entry k included in database DB3 particularly comprises the address $ADD_{32}(k)$ and the secret $SS(k)$ assigned to a node k and pointer information $P(k)$ relative to the frame sequence that was transmitted and that the processing and optimizing unit 36 correctly detected.

In a possible embodiment, pointer information $P(k)$ simply consists of the highest sequence number $SN(k)$ observed by the processing and optimizing unit 36 during processing of frames previously received from node k, i.e., the sequence number of the most recent frame for node k.

In another possible embodiment, pointer information $P(k)$ comprises a sequence number $SN(k)$ and a bitmap $BM(k)$ in which a bit of position q indicates if frame $SN(k+q)$ was received (1) or not (0).

If there are several processing and optimizing units in the network, database DB3 can be shared between these units.

Figure 1C:
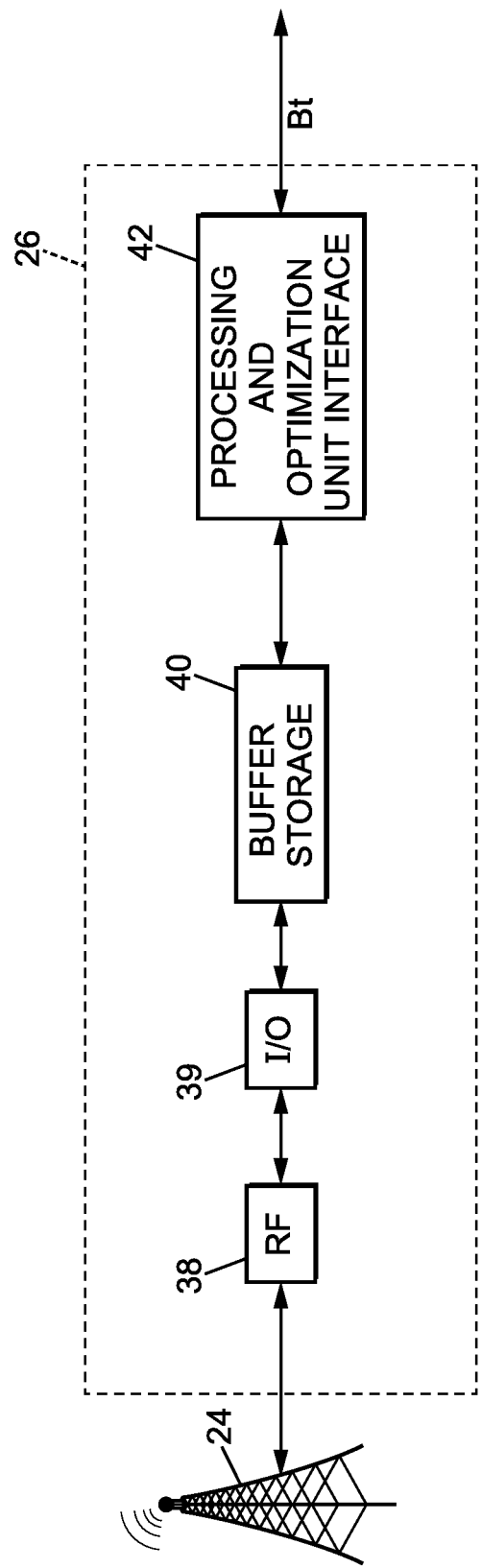
FIG. 1C is an overview of an example of a network interface device capable of implementing the invention.

Used as a receiving interface, a network interface 26 described here with reference to FIG. 1C receives from antenna 24 radio signals from a certain number of nodes and delivers them to an RF transmit-receive stage 38 and then to an input-output 39 that engages in conventional filtering, amplifying, demultiplexing and demodulating operations to produce digital frames. These frames then accumulate in a buffer storage 40 that temporarily stores them while waiting for them to be processed by interface device 42 with the processing and optimizing unit 36. When communication to the processing and optimizing unit 36 is available, device 42 extracts frames from the frame stack temporarily stored in buffer storage 40 and sends them to the processing and optimizing unit 36.

The RF transmit-receive stage can also be arranged to evaluate information relative to the transmission conditions of a received frame. Typically, such information relates to the power levels of the received signals, a receiving timestamp, a receiving antenna identification, etc. This transmission information is also temporarily stored in buffer storage 40 to then be transmitted with the frame by device 42 when processing and optimizing unit 36 is available.

Typically, this evaluation is performed by a receiving channel and an identification of this channel can be included in this transmission information. Channel refers to any information used to characterize the radio properties of the signal: Frequency hopping frequency or pattern, modulation, spread and/or coding parameters.

Figure 1D:
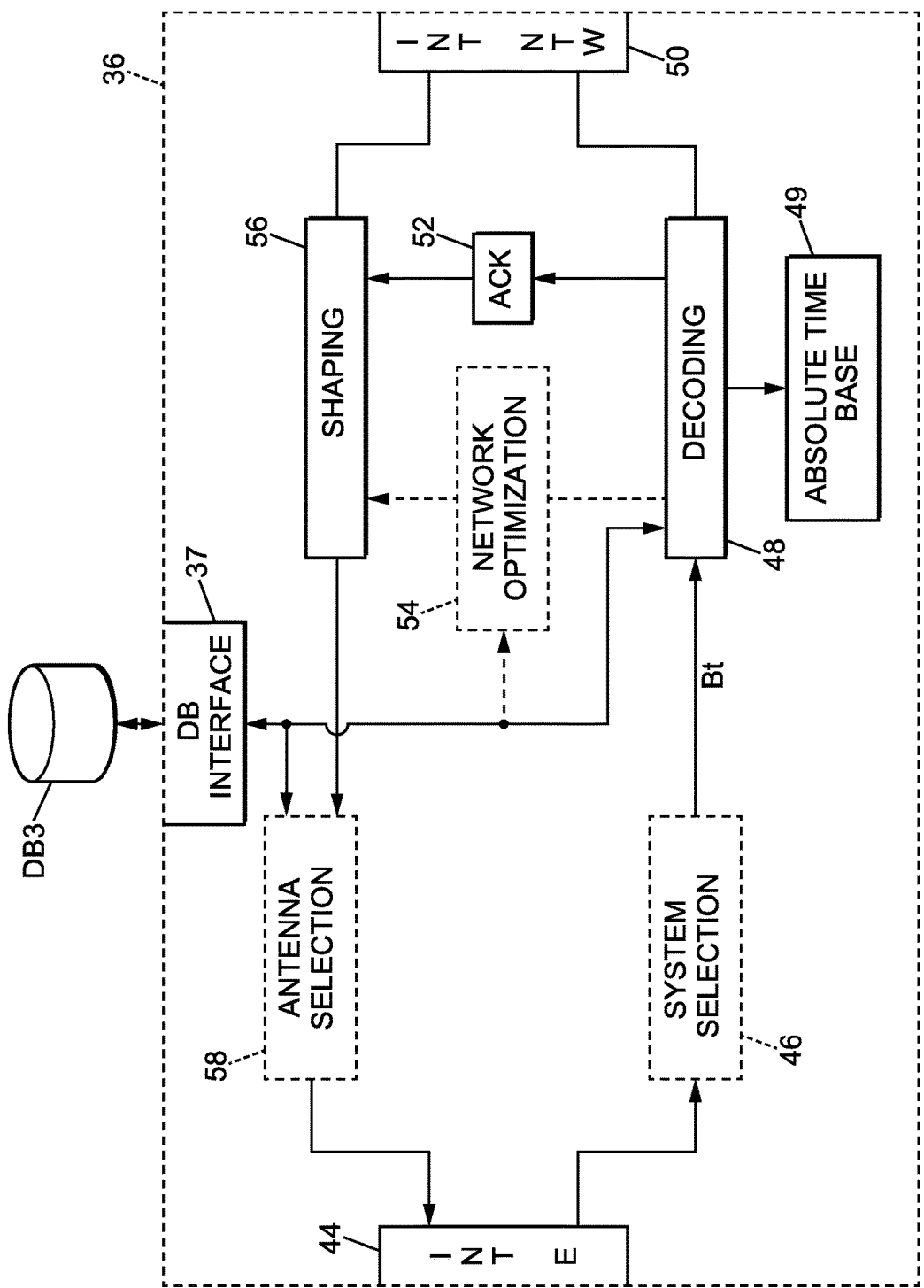
FIG. 1D is an overview of an example of a processing and optimizing unit capable of implementing the invention, FIG. 2 schematically illustrates the steps of a method of emitting a frame according to the invention, in an example of embodiment, FIG. 3 schematically illustrates the steps of a receiving method capable of implementing the invention, in an example of embodiment.

Digital frames, possibly accompanied by transmission information, are then received by the processing and optimizing unit 36, described with reference to FIG. 1D, via an input/output interface 44. Several different processing and optimizing units may have to decode a same frame. In fact, two different antennas may receive a same frame and redirect these frames to two different processing units (within a same system or not). In order to rationalize the processing and optimizing unit management, a selection device 46 may be included in the processing and optimizing units to cooperate with similar devices provided in other processing units so that only one of these units is used for decoding a given frame. This device 46 is represented in dotted lines in FIG. 1D because it is optional.

This processing and optimizing unit selection can be carried out according to the transmission information. The processing and optimizing units can share information received from antennas between each other. Therefore, the selection of the processing and optimizing unit decoding the frame can be a function of an identifier of at least one antenna having received the frame and a power level of the frame received by this antenna. A performance index is calculated by means 46 and compared to those from modules for selecting other processing and optimizing units. Once this comparison is made, only the processing and optimizing unit with the highest index will authorize the transfer of the frame to processor 48. The selection may also be performed by a lexicographical algorithm according to the following order: signal-to-noise ratio; receiving power; identifier of the antenna that had received the frame.

Digital frames included in the Bt signal, possibly accompanied by transmission information, are then transmitted to processor 48 to be decoded. A module 49 for defining an absolute time base is used to synchronize the devices used in the Rx1 system. For example, this module may be of the GPS (global positioning system) type. As specified below with reference to FIGS. 3 and 4, for each decoded frame, processor 48 identifies the address of the node k from which this frame was sent. Here it is noted that a node k is associated with an entry k in the DB3 database. Decoded data are then sent to one or more application servers via the NTW network. Several antennas 26, 30, 34 connected to a same processing and optimizing unit 36 in a system Rx1 can then receive the same frame from a node k. In an embodiment, corresponding to that described below with reference to FIGS. 3 and 4, non-decoded frames received from several different antennas are compared and a selection from among identical frames is performed before decoding. This selection returns a single frame, for example the first received or that for which transmission information relative to the antenna that had received it are most favorable.

In a variation, this same frame is decoded several times, for each antenna that had received it. Transmission information specific to each of the antennas that had received this same frame is then collected in entry k. For example, a number e of sub-entries is created within entry k to store transmission information relative to the e antennas that had received the radio signal from node k. This information is updated every time a new frame is received from a node k. In another example, transmission information relative to the e antennas is averaged and then stored within entry k.

Upon receipt of a frame of number J, a module 52 for managing acknowledgements of frame decoder 36 returns an acknowledgement. A module 22 of node Tx1 is coupled to RF stage 16 to receive the acknowledgments and, if needed, retransmit frames that had not been acknowledged after a given time. In the case where several identical frames are decoded, a single acknowledgement is returned. The acknowledgement and repetition processes are well known to the person skilled in the art.

The exact content of the pointer information P(k) in the DB3 database of system Rx1 depends on the chosen acknowledgement and repetition mode (modules 22 and 52) and on the manner of managing frame losses.

For this same frame of number J, a centralized optimization module 54 of the network generates a message for adapting a transmission parameter of the node k that had sent frame J. This device 54 is represented in dotted lines because it is optional. This adaptation message is generated for every decoded frame according to the transmission information included in the entry k stored in database DB3, when analysis of this transmission information indicates that the current transmission parameters of the node are not optimal. Such parameters are not optimal when too many network resources are consumed in relation to the quality of the connection. If e sub-entries are available for entry k, the reception quality of the best antenna is retained to calculate the optimal adaptation. In the case where an additional service, for example node localization, is activated, then the reception quality of the N (typically 3) best antennas is used to perform the adaptation.

Various transmission parameters can thus be modified. For example, the adaptation message may contain an instruction to modify the transmission power, the spread spectrum factor, the coding redundancy, the data transmission speed, etc.

The acknowledgement message generated by module 52 and the adaptation message generated by device 54 are then shaped in a frame, called an "acknowledgement" frame, by processor 56. This acknowledgement frame can also comprise instructions (for example, switch to high-frequency reporting mode) from the application servers connected to the NTW network and recipients of data coming from nodes.

The decoding of Bt frames by processor 48 can be relatively long (for example on the order of 1 sec.). The sending of acknowledgement frames shaped by module 56 is therefore delayed in relation to a traditional acknowledgement sending procedure. Bidirectional nodes, in conventional networks, immediately start listening after each transmission. This is sub-optimal from the point of view of energy consumption in the case of a longer processing time. Therefore, in an embodiment, after sending a frame, a node waiting for an acknowledgement will not continue to listen, but rather will immediately enter into standby mode for a predetermined duration (typically about one second). During this sleep time, the processing and optimizing unit has enough time to completely process the frame. The possible additional delay caused by the abovementioned processing steps is therefore advantageously taken into consideration.

Other node listening windows can be set. For example, a first listening window may be opened by the node one second after sending it and a second listening window may be opened five seconds after sending it. This allows for greater flexibility in terms of managing the network occupation rate, this parameter being severely restricted by frequency regulation. The occupation rate of certain frequencies may, for example, be limited to 1%.

These listening windows can also be periodic (one second after the last transmission, and then every second up to a maximum number of windows, which can also be known from the database comprising the entries). A plurality of receiving windows over a long total period shapes the traffic of the systems, which are restricted by rules for spectrum use to a maximum level of activity.

Sending acknowledgements can also be delayed in order to allow the servers connected to the NTW network time to process data and to send an instruction for the node to the processing and optimizing unit 36. If other processing tasks need to be carried out, the delay can be extended again. For example, triangulation may require the processing of data received from a plurality of antennas.

The temporal management of acknowledgements described above may be implemented for any type of decoding method. This management is particularly advantageous when the method involves a long processing time.

If the frame for which the acknowledgement message was generated was received by several antennas, transmission information relative to each of these antennas is available in the e sub-entries. In this situation, a device 58 for selecting a best antenna compares this transmission information and the best antenna for transmitting the acknowledgement frame is deduced from this. This device 58 is represented in dotted lines because it is optional. The transmission parameters of the acknowledgement frame (power transmitted, modulation, degree of redundancy, etc.) by the selected antenna can also advantageously be deduced from the transmission information available in the e sub-entries relative to each antenna. In addition, the desired transmission timestamp of the frame to be transmitted can be calculated according to the current spectrum occupancy rate of the chosen transmission channel and the listening windows mentioned above. The acknowledgement frame is then transmitted via interface 44 to the network interface associated with the selected antenna, for example to network interface 26.

The acknowledgement frame is received by network interface 26, here described with reference to FIG. 1C, via interface 42 with the processing and optimizing unit. Buffer storage 40 temporarily stores the acknowledgement frames to be sent. Input-output 39 and an RF transmit-receive stage of interface 26 then prepare to send these frames by respecting the transmission parameters defined by device 58, including the frame transmission time.

Figure 2:
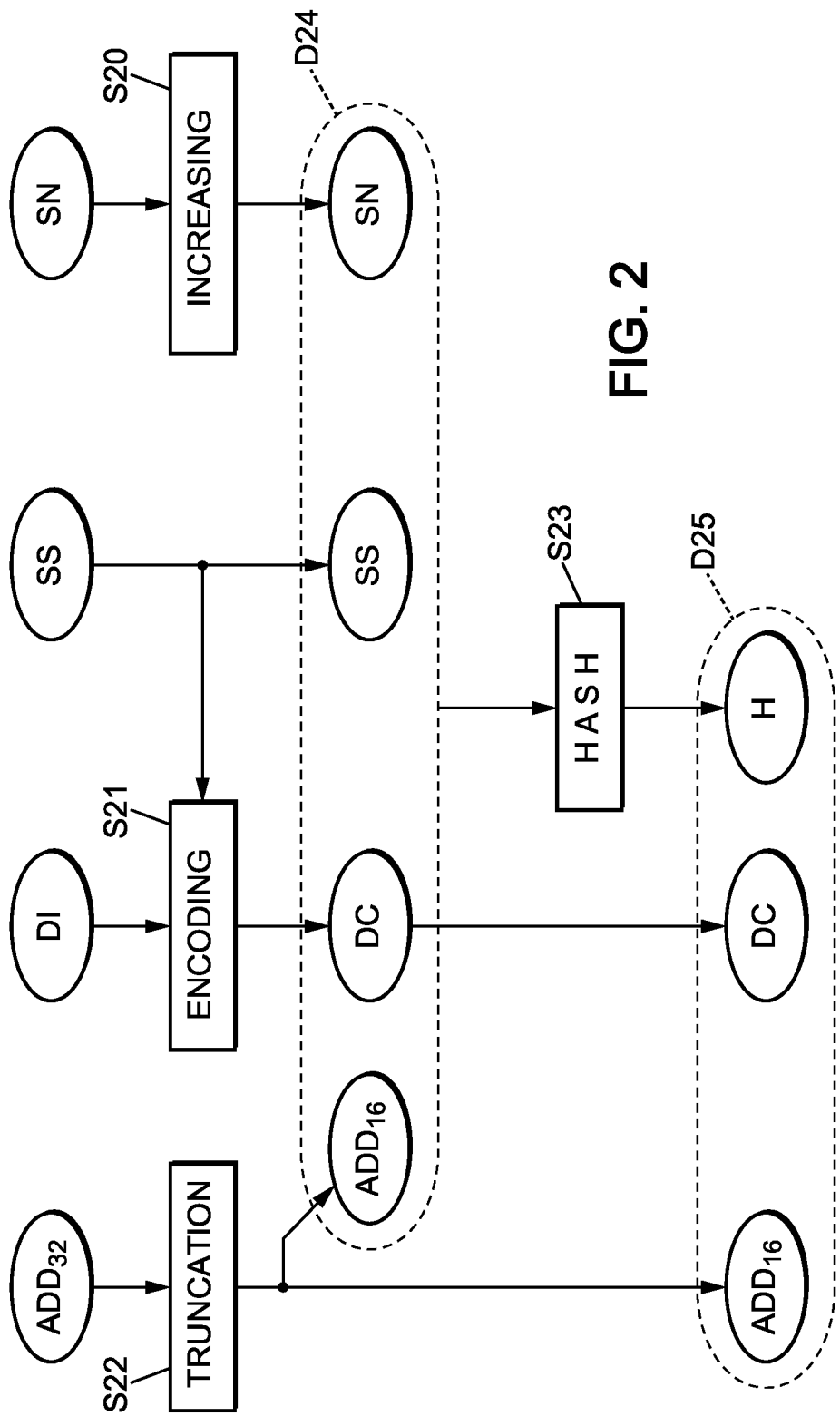

The input data of processor 14 for constructing a digital frame include, as shown in the upper part of FIG. 2:
the address $ADD_{32}$ read in memory 20;
data of interest DI to be transmitted, from sensor 12;
the secret SS read in memory 20;
The sequence number SN to be assigned to the frame, corresponding to the number read in memory 20 and increased by one (step S20).

A step S21 of the processing applied by processor 14 consists of encoding the data of interest DI by means of the secret SS assigned to the node. Such encoding may use a symmetric encoding algorithm conventionally used in cryptographic techniques, for example AES (Advanced Encryption Standard) 128.

A step S22 of the processing applied by processor 14 consists of truncating the address $ADD_{32}$ assigned to node Tx1. For example, the 32-bit address assigned to node Tx1 is truncated to form incomplete address data of 16 bits, here noted $ADD_{16}$. For example, this incomplete address data comprises only 16 low order bits of the 32-bit address.

Processor 14 can then form a word D24 composed of the following elements:
the address $ADD_{16}$ which was truncated in step S22;
the encoded data of interest DC following step S21;
the secret SS;
The sequence number SN increased in step S20.

In step S23, processor 14 calculates a hash code H from word D24. This hash code is calculated by a one-way hash function conventionally used in cryptographic techniques, for example MD5 (Message Digest 5).

After the aforementioned steps S20-S23, processor 14 assembles the digital signal frame D25 that, in the relevant example, includes:
the address ADD16 which was truncated in step S22;
the encoded data of interest DC following step S21;
The hash code H calculated in step S23.

It is observed that sequence number SN is not necessarily included in the frames to be transmitted even though it is made accessible to the processing and optimizing unit, as will be explained later. Therefore the size of the frames can be limited and the energy consumption and transmission channel occupation can be optimized.

Figure 3:
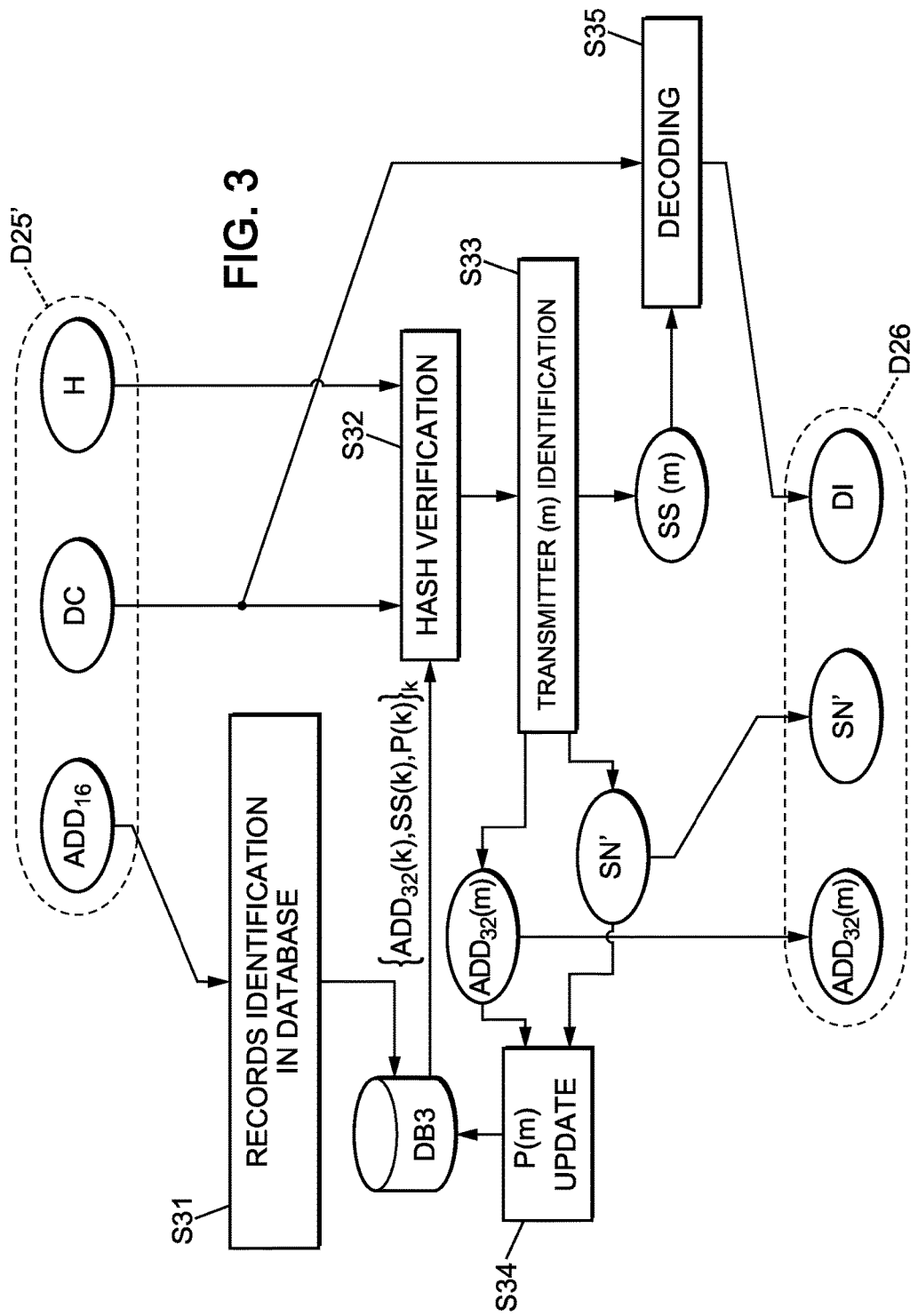

On the processing and optimizing unit 36 side, the input data of processor 48 for processing digital frame D25' comprised in the signal Bt includes, as shown in the upper part of FIG. 3:
the truncated address $ADD_{16}$;
the encoded data of interest DC; and
the hash code H.

A step S31 of identifying K entries included in database DB3 and corresponding to truncated address $ADD_{16}$ is executed by processor 48. This identification leads to the selection of a certain number of entries among the N entries included in database DB3. In fact, incomplete address data $ADD_{16}$ may correspond to a plurality of complete addresses. For example, if this incomplete address data comprises only 16 lower order bits of a complete 32-bit address, up to $2^{32-16}=65536$ complete addresses can correspond to this incomplete address data.

As mentioned above with reference to FIG. 1B, the entries contain information including the complete address $ADD_{32}$(k) assigned to a node k, the secret SS(k) assigned to this node k and pointer information P(k) positioned in relation to a sequence number SN(k).

A step S32 of verifying the hash code H extracted from the received frame D25' is executed by processor 48. The hash codes calculated from the entries identified in step S31 are compared to the hash code H received. The steps implemented during this verification are for example those described below with reference to FIG. 4.

A step S33 of identifying an entry m (i.e., a node m) resulting in a hash code identical to the hash code H extracted from received frame D25' is then implemented by processor 48. As specified below with reference to FIG. 4, step S32 is repeated for K entries identified in step S31 as long as no comparison code is identified. Statistically, a single entry will result in a hash code identical to hash code H. The identified entry m corresponds to a node m and therefore comprises the complete address $ADD_{32}$(m) and the secret SS(m) assigned to this node m. Sequence number SN' of the received frame is also deduced from steps S32 and S33.

In step S34, pointer information P(m) is updated in the entry m stored in database DB3 concerning address $ADD_{32}$(m), by taking the sequence number SN' that was detected into consideration. The transmission information associated with this frame is also added to entry m. Within an entry m, this information can be stored separately for each decoded frame or can simply be updated every time a new frame is decoded.

Lastly, in step S35, the encoded data extracted from the received frame are decoded by using the secret SS(m) contained in the identified entry m.

After the aforementioned steps S31-S35, processor 48 transmits data D26, resulting from processing the received frame, to one or more application servers via the NTW network. The data D26 transmitted for a frame comprise:
the address $ADD_{16}$ received in the frame;
the sequence number SN' that was identified in step S33;
The data of interest DI decoded in step S35.

These data may also comprise transmission information of the received frame.

Figure 4:
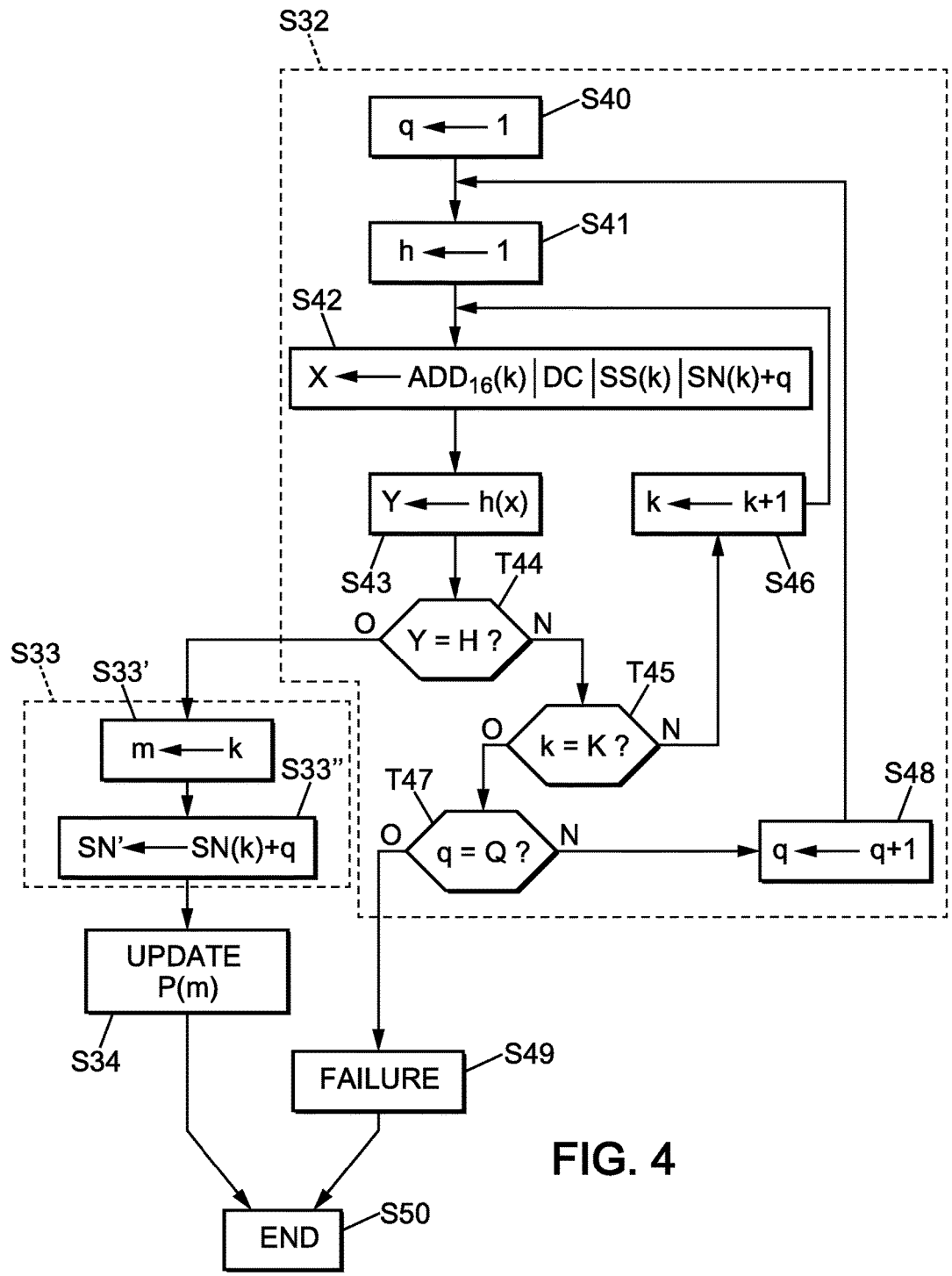
FIG. 4 is a flow chart showing an example of embodiment of the identification of a node in an example of the hash code comparison method capable of implementing the invention.

With reference to FIG. 4, an example of implementation of step S32 of verifying the hash code H extracted from the received frame will now be detailed, comprising the following steps:
S40: initialization to 1 of a counting variable q. This counting variable q scans a set of sequence numbers after SN(k) contained in the pointer information P(k) of an entry k from database DB3.

S41: initialization to 1 of a counting variable k. This counting variable k scans all K entries identified in step S31.

S42: formation of a word X composed of the following elements:
the complete address $ADD_{32}(k)$ assigned to node k and extracted from entry k;
the encoded data DC extracted from the received frame;
the secret SS(k) assigned to node k and extracted from entry k;
an integer equal to SN(k)+q. The sequence number SN(k) is extracted from the pointer information included in entry k.

S43: Calculation of a hash code Y from word X (Y=h(X)). The function of hash h is the same as that used at node Tx1.

T44: Verification that hash code Y is equal to hash code H extracted from the received frame. Displacement to step T45 if the codes are different, displacement to step S33 if not.

T45: Verification that the counting variable k is not equal to the maximum number K of entries identified in step S31. Displacement to step S46 if k is different from K, displacement to step T47 if not.

S46: Increasing the counting variable k by one and then returning to the aforementioned step S42.

T47: verification that the counting variable q is not equal to the maximum value Q authorized for counting variable q. Integer Q can be determined by taking the usual number of frames successively transmitted by a node, the available processing power, the database storage capacity, the time available for decoding, etc., into consideration. Displacement to step S48 if q is different from Q, displacement to step S49 (failure) if not.

S48: Increasing the counting variable q by one and then returning to the aforementioned step S41.

S33: identification of a node m (step schematically represented in FIG. 3), comprising
S33': retaining the index k that gave a positive result during previous test T44 as the entry index m;
S33": Controlling module 52 of processing and optimizing unit 36 so that it confirms the receipt, to node of address $ADD_{32}(m)$ of a frame with a sequence number SN', and issuing the number SN' to be included in output data D26.

S34 (also with reference to FIG. 3): Updating the pointer information P(m) contained in the entry m of database DB3.

S49: Failure, no entry was identified.
S50: End.

In the case where the pointer information P(k) of an entry k is limited to the sequence number SN(k) of the last frame received from node k, step S34 simply consists of taking SN(m)=SN'. The verification of hash codes S32 according to FIG. 4 above then suddenly deals with the case of frame loss. We take the example of a (p+1)-th frame of a node m that is received by the processing and optimizing unit before the p-th frame of the same node m (break in sequence or loss of frame p). In this situation, the update value of the sequence number included in entry m is taken to be equal to p+1 in step S34. Therefore, during processing of the next frame emitted from node k, the loop scanning the sequence numbers will start at p+2 for entry m. Any frame coming from node m and having p as the sequence number will therefore be ignored. If, in node m, module 22 for managing acknowledgements sends the frame with sequence number p again, the repetition will be unnecessary if the following frame p+1 was correctly transmitted and received. It is therefore necessary, in this situation, to limit the number of repetitions of a frame. One can for example be limited to three repetitions.

Limiting the pointer information P(k) to the single sequence number SN(k) of the last frame received (with SN(m)=SN' in step S34) is appropriate in the case of an acknowledgement and repetition protocol where a node is only authorized to transmit a frame with number SN+1 after having received acknowledgement of the frame with number SN. In this situation, the loop on the sequence numbers (indexed by q in FIG. 4) is no longer necessary, which amounts to taking Q=1.

In a variation of the method described above, a bitmap BM(k) of length Q is included in the pointer information P(k) of an entry k in addition to the sequence number SN(k) pointer. This map is updated together with the sequence number SN(k) for the entry k=m in step S34.

This bitmap BM(k) comprises a bit $BM(k)_q$ for each integer q ranging from 1 to Q, in which the value indicates if the frame of sequence number SN(k)+q was already received (1) from node k or if it was never received (0). Here, the sequence number SN(k) is that of the last frame from a sequence of frames, all correctly received, that were transmitted by a same node k.

A test on bit $BM(k)_q$ may possibly be added (at least when q>1) just before step S42 from FIG. 4 to verify if the frame with sequence number SN(k)+q was already received from node k. If that is the case ($BM(k)_q=1$), the hash code is not calculated, processor 48 going directly to loop iteration termination test T45.

In this variation, the update of bitmap BM(m) in step S34 may consist of:
positioning bit $BM(m)_q$ at 1;
if all $BM(m)_q$ are at 1, taking r=Q+1; if not identify the smallest index r so that $BM(k)_r=0$;
taking SN(m)=SN(m)+r−1;
advancing bitmap BM(k) by r−1 positions and placing r−1 zeros at the end.

In this variation, a frame loss is only produced if the processing and optimizing unit successfully receives a frame p+Q+1 without having successfully received frame p and all of its repetitions up to the transmission of frame p+Q+1. The number Q may be sized to make this specific case very unlikely. Increasing Q does not necessarily overload processor 48 since the great majority of frames are received without loss of sequence.

It will be noted that many other schemes for acknowledging and managing frame reception windows are possible in the context of the present invention.

The first function of a hash code is generally to ensure that the integrity of the frame can be verified when it is decoded. In the present invention, hash code H is used for this integrity control, but it is also used to recover other useful information that therefore does not need to be explicitly transmitted. This information is:
bits of address $ADD_{32}$ assigned to the node which issued the frame, which are not part of the truncated address $ADD_{16}$ included in the frame;
The sequence number SN of the frame.

If the address assigned to the node is represented over 32 bits, the sequence number over 16 bits and the hash code over 32 bits for verifying integrity, the header size of the frames transmitted is reduced from 80 bits (32+16+32=80 bits) to only 48 bits (16+32=48 bits). In the particular case of single-bit data of interest (alarms), this represents an improvement of (81−49)/81=39.5%, allowing the number of sensors in a vast M2M network to be multiplied over a given area.

Of course, truncating node addresses from 32 bits to 16 bits is only a particular case to which the invention is not limited. There are two extreme cases: (1) the entire address is transmitted; and (2) no address bit is transmitted. In case (1), the processor load of processor 48 of the processing and optimizing unit is minimal (the loop indexed by k is not necessary because the node is explicitly identified), but the header size reduction is limited to that resulting from the possible non-transmission of the sequence number. In case (2), the headers have a very small size, but to the detriment of the processor 48 load which must then scan all entries in the base. Any truncation length between these two extreme cases is possible, the choice being made according to the general sizing of the M2M network and a compromise between header compression rate and processing power.

Above the formation of a word D24 used for calculating the hash code and comprising the truncated address $ADD_{16}$ is described. In a variation, this word comprises the complete address $ADD_{32}$ instead of the truncated address $ADD_{16}$ for calculating the hash code, and therefore processor 48 will use the complete address $ADD_{32}(k)$ recovered in database D23 in step S42 to compose the word X to be hashed. This word may also include a truncated address with a different length.

Another variation consists of including the sequence number SN in the transmitted frames, most of the header size reduction then being caused by the transmission of incomplete address data. The transmitted frames may also include only part of the sequence number SN, for example a few low order bits, processor 48 can complete the number by using information updated in its database.

In another particular embodiment, the processing and optimizing unit performs additional tasks before transmitting decoded data to the application servers. Therefore, when a frame transmitted by a given node was received through several antennas, it is possible, at the processing and optimizing unit, to use triangulation to calculate the geolocating information.

In addition, the utilization of centralized node database DB3 makes a very flexible utilization of the processing and optimizing unit possible:

each node can use a different version of the MAC (medium access control) layer, indexed in the centralized database, without requiring MAC version information that could further clutter the headers. Processor 48 may try to decode a packet by trying several MAC layers if necessary. This especially facilitates updates, network maintenance and the introduction of new functionalities.

sleep timers in connection with acknowledgement ACK, and the delayed acknowledgement mechanism, can be configured for each sensor.

updating information relative to the different encoding techniques used (hash code, encoding data of interest) can also be integrated with this database. Therefore, the system is advantageously updated transparently and fluidly (simple update of the centralized database).

More generally, the reception, coding and decoding process can be adapted to every node by means of such a database.

The present invention is not limited to the embodiments described above by way of example; the invention extends to other variants.

Therefore, an embodiment in which the frames comprise 32- or 16-bit headers is described. Of course, the size and format of such frames can change and can take, for example, values of 64 or 128 bits.

The invention claimed is:

1. A method of receiving a data frame emitted in a network connected to several nodes, wherein an address and a secret are respectively assigned to each node, the method comprising:
    extracting encoded data and a frame hash code from the frame;
    consulting a database with respective entries relating to the nodes, the entry relating to a node containing information including the address and the secret assigned to said node;
    for at least one database entry:
        calculating at least one hash code from elements comprising encoded data extracted from the frame and the secret contained in said entry;
        comparing the calculated hash code with the frame hash code extracted from the frame; and
        selecting said entry if the compared hash codes coincide;
    and processing the frame, the processing comprising an identification of the address contained in the selected entry as being the address assigned to the node where the frame comes from, and a decoding of the encoded data extracted from the frame by using the secret contained in the selected entry.

2. The method according to claim 1, wherein incomplete address data is also extracted from the frame, and wherein calculating and comparing the hash code are executed for database entries containing an address corresponding to the extracted incomplete address data.

3. The method according to claim 2, wherein the elements for calculating the hash code for a database entry also comprise at least one part of the address contained in said entry.

4. The method according to claim 1, wherein the information contained in the database entry relating to a node also includes pointer information of at least one sequence number of a frame that was received and processed by identifying the address contained in said entry,
    and wherein the elements from which at least one hash code for said entry is calculated also comprise an integer determined according to pointer information contained in said entry.

5. The method according to claim 4, wherein the frame processing also comprises a determination of a sequence number of the frame from among a sequence of frames emitted from the identified address, and an update of pointer information contained in the selected entry according to the determined sequence number of the frame.

6. The method according to claim 5, wherein calculating and comparing the hash code are executed several times for at least one database entry, with respective integers chosen within an interval identified by pointer information contained in said entry, and wherein, after a database entry is selected, the determination of the frame sequence number comprises an identification of the integer for which the compared hash codes coincide.

7. The method according to claim 1, also comprising an evaluation of a power level and/or timestamp information of the frame, and wherein the frame processing also comprises an update, in the entry relating to the node whose address was identified, of a power information according to the power level evaluated and/or the timestamp information.

8. The method according to claim 1, also comprising:
transmitting a message to adapt at least one transmission parameter to the node whose address was identified, said adaptation message being generated according to information comprised in the entry relating to said node.

9. A method of transmitting a data frame by a node, an address and a secret being assigned to the node, the method comprising:
encoding data through the secret assigned to the node;
generating a hash code from elements comprising the encoded data and the secret assigned to the node; and
including the encoded data and the generated hash code in the transmitted frame,
wherein the elements from which the hash code is calculated also comprise a sequence number of the transmitted frame, and wherein said sequence number of the transmitted frame is excluded from the transmitted frame.

10. The method according to claim 9, also comprising:
truncating the address assigned to the node to form incomplete address data; and
including the incomplete address data in the transmitted frame.

11. The method according to claim 9, also comprising, following transmission of the frame:
entering the node in standby mode for receiving an acknowledgment message for a predetermined duration.

12. A non-transitory computer readable storage medium, having stored thereon a computer program comprising program instructions, the computer program being loadable into a data-processing unit and adapted to cause the data-processing unit to carry out, for receiving a data frame emitted in a network connected to several nodes, in which an address and a secret are respectively assigned to each node, the method comprising:
extracting encoded data and a frame hash code from the frame;
consulting a database with respective records relating to the nodes, the record relating to a node containing information including the address and the secret assigned to said node;
for at least one database record:
calculating at least one hash code from elements comprising encoded data extracted from the frame and the secret contained in said record;
comparing the calculated hash code with the frame hash code extracted from the frame; and
selecting said record if the compared hash codes coincide;
and processing the frame, the processing comprising an identification of the address contained in the selected record as being the address assigned to the node where the frame comes from, and a decoding of the encoded data extracted from the frame by using the secret contained in the selected record.

13. A processing and optimizing unit to communicate with several nodes, the processing and optimizing unit comprising:
an interface with a database with respective entries relating to the nodes of the network, the entry relating to a node containing information including an address and a secret assigned to said node;
an extraction unit for receiving a data frame and extracting from it encoded data and a frame hash code;
a code verifier arranged to carry out, for at least one entry from the database:
calculating at least one hash code from elements comprising encoded data extracted from the received frame and the secret included in the information from said entry;
comparing the calculated hash code with the frame hash code extracted from the received frame; and
selecting said entry if the compared hash codes coincide;
and a unit for decoding the frame received to execute processing comprising identifying the address contained in the selected entry as being the address assigned to the node where the received frame comes from, and decoding the encoded data extracted from the received frame by using the secret contained in the selected entry.

14. A system for communicating with several nodes, the system comprising:
a plurality of antennas for receiving signals from said nodes, said signals comprising data frames; and
a processing and optimizing unit to communicate with several nodes, the processing and optimizing unit comprising:
an interface with a database with respective entries relating to the nodes of the network, the entry relating to a node containing information including an address and a secret assigned to said node;
an extraction unit for receiving a data frame and extracting from it encoded data and a frame hash code;
a code verifier arranged to carry out, for at least one entry from the database:
calculating at least one hash code from elements comprising encoded data extracted from the received frame and the secret included in the information from said entry;
comparing the calculated hash code with the frame hash code extracted from the received frame; and
selecting said entry if the compared hash codes coincide;
and a unit for decoding the frame received to execute processing comprising identifying the address contained in the selected entry as being the address assigned to the node where the received frame comes from, and decoding the encoded data extracted from the received frame by using the secret contained in the selected entry.

15. A node for communicating over a telecommunication network, an address being assigned to the node and a secret also being assigned to the node, the node comprising:
a unit for encoding data through the secret assigned to the node;
a hash code generator, the hash code being generated from elements comprising the encoded data and the secret assigned to the node; and
a generator of a frame to be emitted, the frame including encoded data and the generated hash code,
wherein the elements from which the hash code is calculated also comprise a sequence number of the transmitted frame, and wherein said sequence number of the transmitted frame is excluded from the transmitted frame.

16. The node according to claim 15, wherein the frame also comprises incomplete address data obtained by truncating the address assigned to the node.

17. A method of transmitting a data frame by a first node of a plurality of nodes, wherein an address and a secret are assigned to the first node, the secret being unavailable to the plurality of nodes except the first node, the method comprising:

encoding data through the secret assigned to the first node;

generating a hash code from elements comprising the encoded data and the secret assigned to the first node; and including the encoded data and the generated hash code in the transmitted frame.

18. A first node for communicating over a telecommunication network comprising a plurality of nodes including the first node, an address and a secret being assigned to the first node, the secret being unavailable to the plurality of nodes except the first node, the first node comprising:

a unit for encoding data through the secret assigned to the first node;

a hash code generator, the hash code being generated from elements comprising the encoded data and the secret assigned to the first node; and a generator of a frame to be emitted, the frame including encoded data and the generated hash code.

* * * * *